(12) United States Patent
Fukutome et al.

(10) Patent No.: US 12,470,877 B2
(45) Date of Patent: Nov. 11, 2025

(54) MEMS ELEMENT AND METHOD OF MANUFACTURING THE SAME

(71) Applicant: Nisshinbo Micro Devices Inc., Tokyo (JP)

(72) Inventors: Takao Fukutome, Fujimino (JP); Yoshimitsu Karasawa, Fujimino (JP)

(73) Assignee: NISSHINBO MICRO DEVICES INC., Tokyo (JP)

( * ) Notice: Subject to any disclaimer, the term of this patent is extended or adjusted under 35 U.S.C. 154(b) by 190 days.

(21) Appl. No.: 18/551,524

(22) PCT Filed: Mar. 23, 2021

(86) PCT No.: PCT/JP2021/012019
§ 371 (c)(1),
(2) Date: Sep. 20, 2023

(87) PCT Pub. No.: WO2022/201316
PCT Pub. Date: Sep. 29, 2022

(65) Prior Publication Data
US 2024/0171918 A1     May 23, 2024

(51) Int. Cl.
*H04R 19/04* (2006.01)
*B81B 3/00* (2006.01)
(Continued)

(52) U.S. Cl.
CPC ............ *H04R 19/04* (2013.01); *B81B 3/001* (2013.01); *B81B 3/0072* (2013.01);
(Continued)

(58) Field of Classification Search
CPC ........ H04R 19/04; H04R 7/04; H04R 31/003; H04R 2201/003; H04R 19/005;
(Continued)

(56) References Cited

U.S. PATENT DOCUMENTS

2002/0067663 A1* 6/2002 Loeppert ............... B81B 3/0072
367/181
2009/0185700 A1* 7/2009 Suzuki ................ H04R 19/005
381/174
(Continued)

FOREIGN PATENT DOCUMENTS

JP     2007-208548 A     8/2007
JP     2014-90514 A      5/2014
(Continued)

OTHER PUBLICATIONS

International Search Report issued May 25, 2021, in connection with international application No. PCT/JP2021/012019 from the Japanese Patent Office.
(Continued)

*Primary Examiner* — Angelica M McKinney
(74) *Attorney, Agent, or Firm* — Elizabeth L. Neal; DeWitt LLP

(57) ABSTRACT

A MEMS element comprises a substrate 1 with an opening 1a, a vibrating membrane 3 formed on the substrate 1 through an insulating film 2, and a backplate 5 fixed to a spacer 4 on the substrate 1. The vibrating membrane 3 has intermittent slits 3a along its edge 3d. The backplate 5 has acoustic holes 5b in the center, and etching holes 5c in the periphery thereof and closer to the edge side than the outermost peripheral end of the slits of the vibrating membrane 3 in planar view. The edge 3d of the vibrating membrane 3 and portion of the insulating film 2 under the vibrating membrane 3 are spaced apart from the bottom end (Continued)

of the spacer 4. The insulating film is etched from the edge 3*d* of the vibrating membrane 3 and the slits 3*a* to under the vibrating membrane 3.

18 Claims, 7 Drawing Sheets

(51) Int. Cl.
  *B81C 1/00* (2006.01)
  *H04R 7/04* (2006.01)
  *H04R 31/00* (2006.01)
(52) U.S. Cl.
  CPC ........... *B81C 1/00666* (2013.01); *H04R 7/04* (2013.01); *H04R 31/003* (2013.01); *B81B 2201/0257* (2013.01); *B81B 2203/0127* (2013.01); *B81C 2201/0109* (2013.01); *H04R 2201/003* (2013.01)
(58) Field of Classification Search
  CPC ....... H04R 31/00; B81B 3/001; B81B 3/0072; B81B 2201/0257; B81B 2203/0127; B81B 3/0018; B81C 1/00666; B81C 2201/0109
  See application file for complete search history.

(56) References Cited

U.S. PATENT DOCUMENTS

| | | | |
|---|---|---|---|
| 2011/0266640 A1 | 11/2011 | Kasai et al. | |
| 2012/0091544 A1* | 4/2012 | Reichenbach | ....... H04R 19/005 |
| | | | 257/416 |
| 2016/0037266 A1* | 2/2016 | Uchida | .................... H04R 7/06 |
| | | | 381/174 |
| 2017/0311088 A1* | 10/2017 | Sun | ...................... H04R 31/003 |
| 2019/0210866 A1 | 7/2019 | Chen et al. | |

FOREIGN PATENT DOCUMENTS

| | | | | |
|---|---|---|---|---|
| JP | 2017121028 A | * | 7/2017 | ............ H04R 19/04 |
| KR | 20110120209 A | | 11/2011 | |
| WO | 2014141508 A | | 9/2014 | |

OTHER PUBLICATIONS

International Preliminary Report on Patentability for PCT/JP2021/012019, issued from the Japanese Patent Office on Oct. 5, 2023.
Office Action received for Korean Patent Application No. 10-2023-7030018, mailed on Apr. 10, 2025, 11 pages. (6 pages of English Translation and 5 pages of Official Copy).

* cited by examiner

MEMS ELEMENT AND METHOD OF MANUFACTURING THE SAME

CROSS-REFERENCE TO RELATED APPLICATIONS

The present application is the U.S. National Stage application of International Application No. PCT/JP2021/012019, filed Mar. 23, 2021, which International Application was published on Sep. 29, 2022, as International Publication No. WO2022/201316, the contents of which are incorporated herein by reference in their entireties.

TECHNICAL FIELD

The present disclosure relates to a MEMS element, particularly a capacitive MEMS element used as a microphone, a variety of sensors, a switch, etc., and a method of manufacturing the same.

BACKGROUND ART

As shown in FIG. 7, in a MEMS element (microphone) 200 of related technology, a vibrating membrane 30 made of a conductor is provided on a silicon substrate 10 through an insulating film 20, and a backplate 50 having a conductor part (fixed electrode 50a) is laminated through a spacer 40 on the vibrating membrane 30. The backplate 50 is formed so as not to be deformed, and a plurality of acoustic holes 50b are formed in a part of the backplate 50 facing the vibrating membrane 30. For example, the vibrating membrane 30 vibrates by a sound pressure propagated through this acoustic hole 50b, changing capacitance between the backplate 50 and the vibrating membrane 30. The MEMS element is configured so that the change in capacitance is taken out as an electric signal, which is transmitted to a speaker or the like (not shown).

Such a MEMS microphone 200 detects very weak changes in capacitance, and therefore, if a parasitic capacitance between the vibrating membrane 30 and the backplate 50 is large, sensitivity as the microphone is lowered. For this reason, for example, Patent Document 1 shows a structure in which unnecessary capacitance is not formed between the vibrating membrane 30 and the backplate 50 by making a conductor part of a vibrating plate (vibrating membrane 30) to have a smaller range than the vibrating plate, or as shown in FIG. 7(b), by separating the vibrating plate and a silicon oxide film being the later thereunder into an inner region and an outer region, respectively.

PRIOR ART DOCUMENT

Patent Document

Patent Document 1: JP 2007-208548 A

SUMMARY OF THE INVENTION

Problem to be Solved by the Invention

In order to improve sensitivity of a MEMS microphone, efforts have been made to reduce influence of such parasitic capacitance as mentioned above. However, even if the parasitic capacitance is suppressed, there is a problem that characteristics, such as sensitivity, of the microphone may vary.

The present inventors conducted intensive studies about a cause of this variation in characteristics of the MEMS microphone. As a result, they have found that a vibrating membrane is affected by an internal stress in each film such as a sacrificial layer film that serves as a spacer, a backplate, and an insulating film to be also subjected to stress, which causes variation in magnitude of vibration. They have found that, when the MEMS microphone is housed in a package, the MEMS microphone is fixed to a printed circuit board, etc. using resin and the like, and thus the vibrating membrane is also affected via a substrate by internal stresses of these materials as well as by difference in coefficient of linear expansion due to the connection.

Therefore, it is an object of the present disclosure to provide a MEMS element that can exhibit a more stable performance and achieve a high sensitivity.

Means to Solve the Problem

One embodiment of the MEMS element of the present disclosure comprises a substrate with an opening, a vibrating membrane formed on the substrate through an insulating film, wherein slits are intermittently formed in a peripheral portion of the vibrating membrane along an edge thereof, and a backplate that is fixedly formed on a spacer formed on a peripheral portion of the substrate and has a plurality of acoustic holes in a central portion thereof, wherein the backplate has an etching hole at a position on an outer peripheral portion than the plurality of acoustic holes and closer to the edge than the outermost peripheral end of the slits of the vibrating membrane in planar view, wherein the slits are formed to be positioned above a portion of the substrate where the opening is not formed, wherein the edge of the vibrating membrane and the insulating film under the vibrating membrane are spaced apart from the bottom end of the spacer, and wherein a spacer side end of the insulating film under the vibrating membrane is positioned closer to the slits than the edge of the vibrating membrane and a slits side end of the insulating film under the vibrating membrane is positioned closer to the spacer than the slits.

One embodiment of the method of manufacturing the MEMS element of the present disclosure comprises the steps of: forming an insulating film on a substrate; forming a conductive film on the insulating film, patterning a peripheral edge thereof, as well as forming a slit in a peripheral portion of the conductive film to form a vibrating membrane; forming a sacrificial layer on the vibrating membrane; forming a backplate film including a fixed electrode on the sacrificial layer; forming a backplate which provided with a plurality of acoustic holes and an etching hole around the periphery of the plurality of acoustic holes in the backplate film; forming an opening in the substrate at a position below a central portion of the vibrating membrane; and removing the insulating film under the vibrating membrane so as to leave only a portion of the insulating film between the outermost periphery of the slit and the edge of the vibrating membrane, wherein the substrate is immersed in an etchant, thereby a portion of the insulating film is removed from the outermost peripheral side of the slit of the vibrating membrane and from the edge side of the vibrating membrane, while leaving a peripheral portion of the sacrificial layer as a spacer, characterized in that the etching hole is formed closer to the peripheral portion side of the backplate than the outermost periphery of the slit of the vibrating membrane in planar view, and that the insulating film remaining under the vibrating membrane is made to remain in a ring shape that holds the vibrating membrane, by adjusting at least one of a position of the etching hole, a size of the etching hole, an etching time, and a concentration of the etchant.

Effects of the Invention

According to the MEMS element of the present disclosure, the vibrating membrane and the insulating film that holds the vibrating membrane are separated from the spacer part, and the vibrating membrane is held through the insulating film having a minimum width with the substrate, so that stress of the vibrating membrane is not affected by other members, for example, the spacer and the backplate, and further, even if the substrate is fixed by resin or the like for a housing, influence of stress generated in the substrate on the vibrating membrane is also suppressed. As a result, a microphone with a stable performance can be obtained.

Furthermore, according to the method of manufacturing the MEMS element of the present disclosure, the etching hole are formed at a position outside the acoustic holes of the backplate and outside the outermost slit formed on the vibrating membrane in planar view, so that at least one of the position of the etching hole, the size of the etching hole, the etching time, and the concentration of the etchant is adjusted in the step of removing the insulating film, thereby suppressing the influence of the stress on the vibrating membrane to be able to optimize the retention of the vibrating membrane and the stable performance.

EMBODIMENT FOR CARRYING OUT THE INVENTION

Next, embodiments of the MEMS element of the present disclosure and embodiments of the method of manufacturing the MEMS element of the present disclosure will be described with reference to the drawings, but the present disclosure is not limited to these embodiments.

Figure 1:
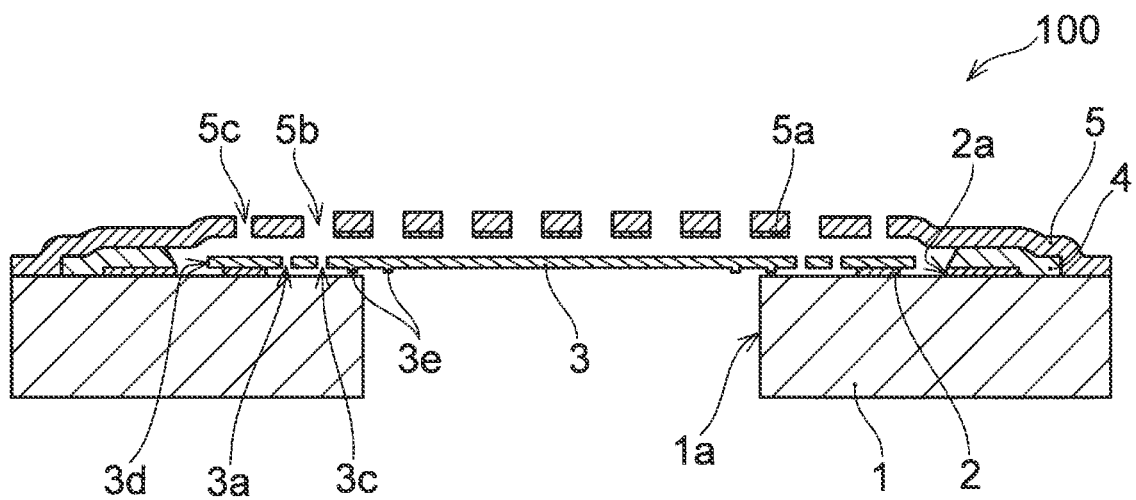
FIG. 1 is a cross-sectional schematic view of a MEMS element that is one embodiment of the present disclosure.

One embodiment of the MEMS element of the present disclosure comprises a substrate 1 with an opening 1a, a vibrating membrane 3 formed on the substrate 1 through an insulating film 2, where slits 3a, 3b are intermittently formed in a peripheral portion of the vibrating membrane 3 along an edge 3d thereof, and a backplate 5 which is fixedly formed on a spacer 4 formed on the periphery portion of the substrate 1 and has a plurality of acoustic holes 5b in the central portion thereof, as shown in FIG. 1. In addition, the backplate 5 has etching holes 5c at a position on the peripheral portion of the plurality of acoustic holes 5b and closer to the edge than the outermost peripheral end of the outer slit 3a of the vibrating membrane 3 in planar view, the slits 3a, 3b are formed to be positioned above a portion of the substrate 1 where the opening 1a is not formed, the edge 3d of the vibrating membrane 3 and the insulating film 2 under the vibrating membrane 3 are spaced apart from the bottom end of the spacer 4, and the insulating film 2 under the vibrating membrane 3 is etched from the edge 3d of the vibrating membrane 3 and the outer slit 3a to under the vibrating membrane 3 into a structure where the ends of the insulating film 2 come into medial side from the edge 3d and the outer slit 3a, respectively.

Figure 2:
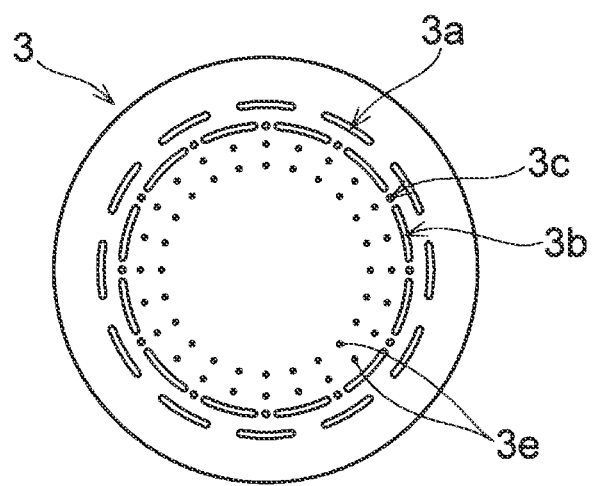
FIG. 2 is a schematic plan view of a vibrating membrane (movable electrode) of the MEMS element of FIG. 1 as viewed from a substrate side.
Figure 3:
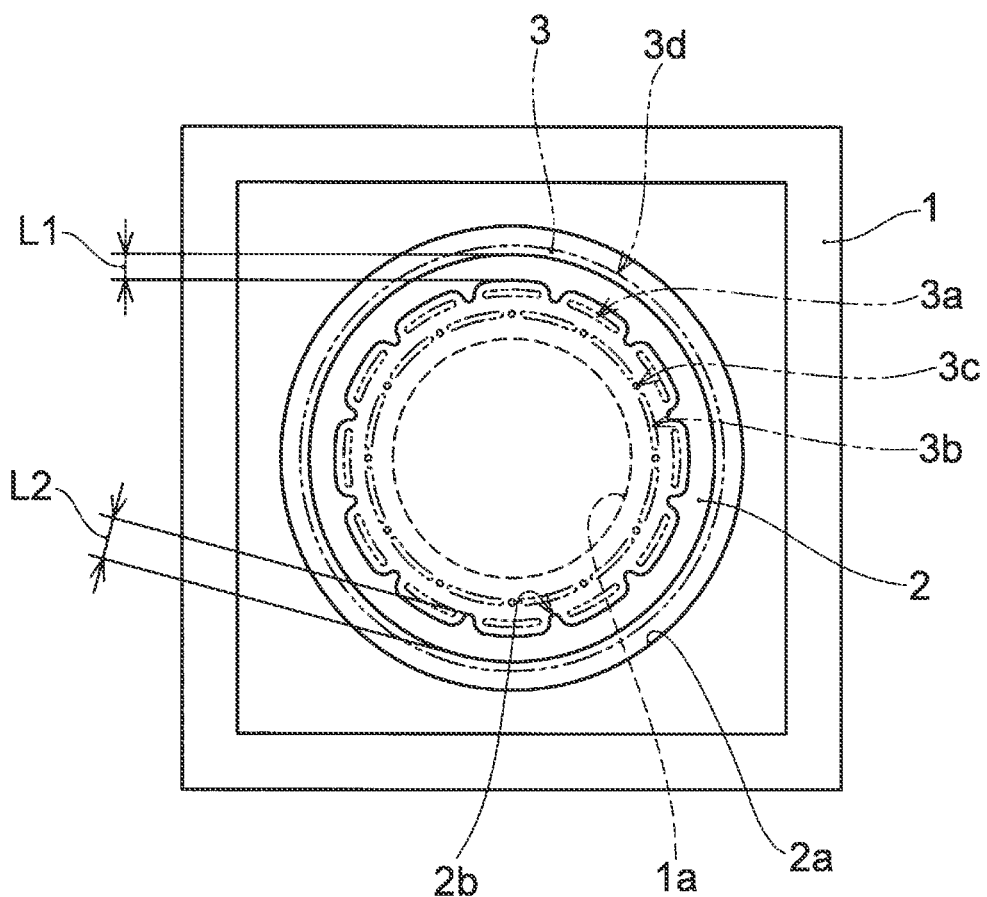
FIG. 3 is a schematic plan view of an insulating film of the MEMS element of FIG. 1.

Besides, FIGS. 1 to 3, for the sake of explanation, sizes of the peripheral portion of the vibrating membrane and the vicinity of slits 3a, 3b as well as the insulating film 2 under the vibrating membrane 3 are drawn in larger scale than the entire MEMS element, which do not faithfully show a ratio of each member in an actual MEMS element.

As mentioned above, as a result of intensive studies on the reason why characteristics such as sensitivity of a MEMS microphone 100 vary, the present inventors have found that this is because there is residual stress in the vibrating membrane 3, and the stress varies for each element, so that a slight difference in vibration of the vibrating membrane 3 arises even when the same sound pressure is applied. They have found that this difference in residual stress is based on various factors such as variations in thicknesses of the insulating film 2, the spacer 4, and the backplate 5 in the manufacturing steps and environments in the manufacturing steps, and further found that the residual stress is also affected by an internal stress of a material such as resin used when assembling this MEMS element 100 into a package or the like.

Figure 6A:
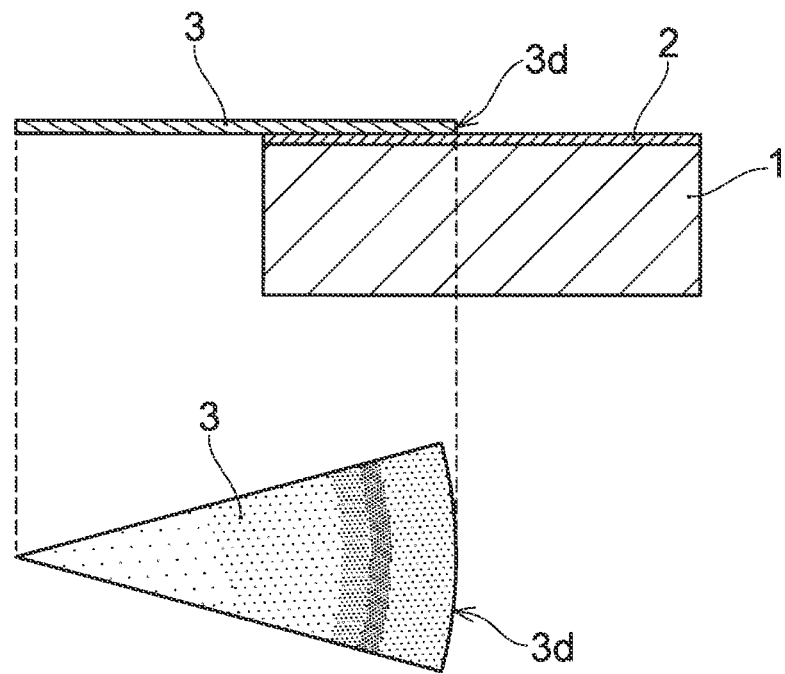
FIG. 6A is a schematic view explaining a result of simulation showing influence of stress on the vibrating membrane.
Figure 6B:
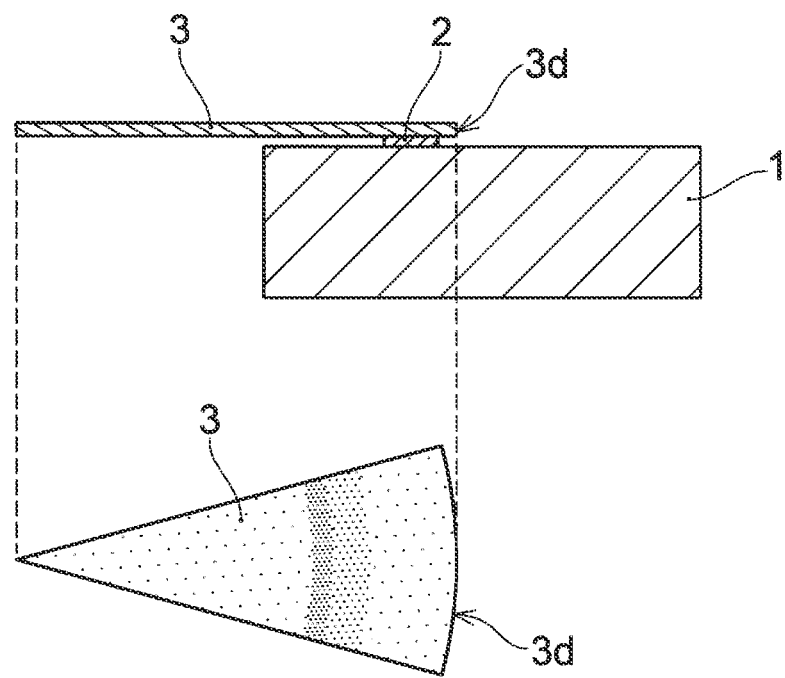
FIG. 6B is a schematic view explaining a result of simulation showing influence of stress on the vibrating membrane.
Figure 7:
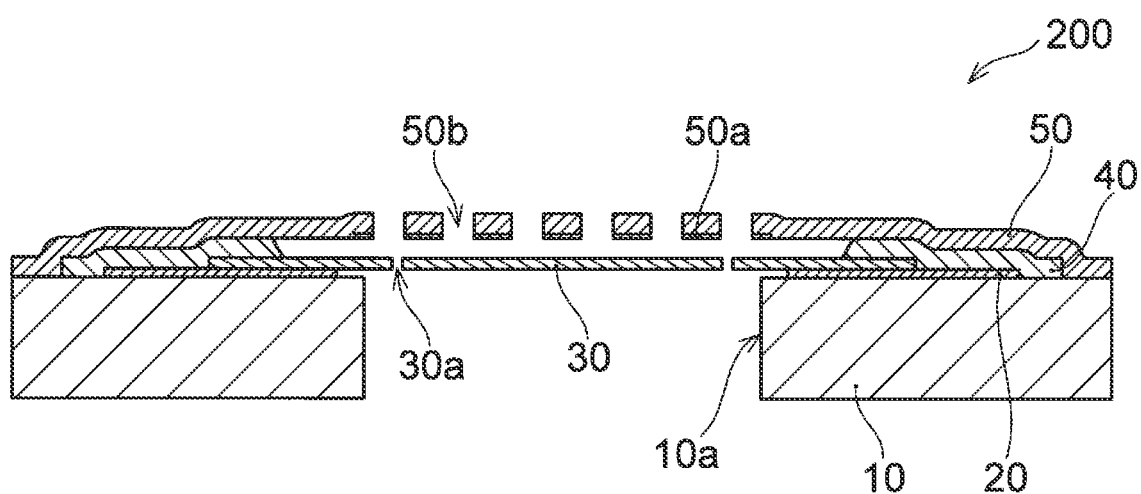
FIG. 7 is a cross-sectional schematic view of a MEMS element of a related technology.

Here, the present inventors have considered that it is impossible to equalize these variations, and that the influence of the residual stress of the vibrating membrane 3 is suppressed by preventing these stresses from being transmitted to the vibrating membrane 3. For this purpose, it is necessary to cut off the influences of the substrate 1 and its surrounding members, for example, the insulating film 2, the spacer 4, and the backplate 5 on the vibrating membrane 3, and therefore the vibrating membrane 3 is separated from the spacer 4 and its bottom portion to be independent therefrom, and is also made contact with the substrate 1 in the minimum range, thereby succeeding in suppression of variations in characteristics of the MEMS microphone, etc. In fact, it has been clear from simulations that the residual stress of the vibrating membrane 3 changes depending on an area of the insulating film 2 that joins the vibrating membrane 3 and the substrate 1, which affects a degree of vibration of the vibrating membrane 3 (FIGS. 6A and 6B). FIGS. 6A and 6B show a degree of influence of the stress on the vibrating membrane 3 by gradation of dots, indicating that the darker the density is, the greater the influence of the stress is. Comparing FIG. 6A in which almost the entire surface between the vibrating membrane 3 and the substrate 1 is joined by the insulating film 2 with FIG. 6B in which the vibrating membrane 3 and the substrate 1 are joined only by the insulating film 2 having a width required to hold the vibrating membrane 3 as shown similarly in FIG. 1, it can be found that magnitude and distribution of the stress received by the vibrating membrane 3 differ depending on an area of the insulating film 2 that joins the vibrating membrane 3 and the substrate 1.

Specifically, the vibrating membrane 3 is joined to the substrate 1 at the peripheral portion through the insulating film 2. Since the vibrating membrane 3 vibrates in response to a change in pressure caused by sound, it can no longer function as the vibrating membrane 3 when detached from the substrate 1. From that point of view, the vibrating membrane 3 needs to be sufficiently fixed to the substrate 1 through the insulating film 2. Therefore, the vibrating membrane 3 is preferably connected to the substrate 1 with a range of a width of the insulating film 2 that remains under the vibrating membrane 3 being as wide as possible. However, as mentioned above, the present inventors have found that, if this connecting part, that is, the width of the remaining insulating film 2 is too wide, the stress of the substrate 1 is transmitted to the vibrating membrane 3 through the insulating film 2, affecting the vibration characteristics of the vibrating membrane 3. Therefore, in the present embodiment, this remaining insulating film 2 is characterized in that it has a minimum width for holding the vibrating membrane 3 (see L1 in FIG. 3), which varies depending on a type of the MEMS element 100, for example, about 5 µm for a small microphone, and in order to reinforce the joint, it is formed, not entirely on the circumference, but as partially having a portion wider than that of the minimum width by about 1 to 3 µm (see L2 in FIG. 3).

In other words, in the present embodiment, by etching the insulating film positioned under the vibrating membrane 3 from the openings (the edge 3d of the vibrating membrane 3 and the outer slit 3a), the width of the insulating film 2 (L1 in FIG. 3), in the portion where the outer slit 3a is located, is narrowed by the etching from the outer slit 3a, and since the etching does not progress so much between the intermittently formed outer slits 3a, the width of the remaining insulating film 2 (L2 in FIG. 3) is relatively widened, so that transmission of the stress from the substrate 1 can be suppressed due to a short length of the insulating film 2 in that portion in a circumferential direction, while exhibiting a holding force for holding the vibrating membrane 3. Thus, the present embodiment is characterized in that the width of the insulating film 2 positioned under the vibrating membrane 3 is adjusted while adjusting etching conditions when etching a sacrificial layer 41 and the insulating film 2.

Examples of the etching conditions for controlling several µm or less of width of the insulating film 2 in this way include adjusting any of the concentration of the etchant which tends to vary, the position and size of the etching hole 5c, the etching time, etc., according to a type and a size of the MEMS element 100 or each production lot.

As the substrate 1 of the present embodiment, a material having mechanical properties as a support substrate, and the like, such as a single crystal silicon, can be used. However, it is not limited to a silicon substrate, and other semiconductor substrates such as a compound semiconductor, SOI substrates, and the like can also be used. A shape of the substrate is not particularly limited.

The insulating film 2 is an oxide film ($SiO_2$) having a thickness of about 0.2 to 1 µm which is formed on the silicon substrate, and is formed by oxidization of the silicon substrate or deposition by a CVD method or the like. The insulating film 2 is not limited to the oxide film and may be a nitride film, but the oxide film is preferable because it is easily etched. If the insulating film 2 is too thick, its stress will affect the vibrating membrane 3, so that it is preferable to make it as thin as possible.

A portion of the insulating film 2 under the vibrating portion of the vibrating membrane 3 is removed and the insulating film 2 is connected to the substrate 1 only at a portion relating to the peripheral portion of the vibrating membrane 3. As mentioned above, the insulating film 2 remains between the vibrating membrane 3 and the substrate 1 within a range as narrow as possible so as not to transmit stress generated on the substrate 1 to the vibrating membrane 3. By way of an example, as shown in FIG. 3 which is a plan view cut at the interface between the substrate 1 and the insulating film 2 to view the insulating film 2 side, the insulating film 2 is into a ring shape by being removed of its inner peripheral side than the vicinity of the outer slit 3a of the vibrating membrane 3 and forming a dividing groove 2a that separates from the peripheral portion in the vicinity of the edge 3d of the vibrating membrane 3. This ring-shaped insulating film 2 is etched to under the vibrating membrane 3 during etching, as will be described later. Therefore, the insulating film 2 is also etched at the ends in the edge 3d side of the vibrating membrane 3 and the spacer 4 side of the outer slit 3a. However, etching does not easily progress between the intermittently formed outer slits 3a, and as shown in FIG. 3, the insulating film 2 remains so as to protrude toward the central portion. In other words, the widths of the insulating films 2 remaining in a ring shape are not uniform, and the width L1 of the insulating film 2 at the outer slit 3a part of the vibrating membrane 3 is narrower than the width L2 of the insulating film 2 between the outer slits 3a, so that the insulating film 2 is formed to have unevenness at its inner peripheral end. As for the relationship between the width L1 of the insulating film 2 in the vicinity of the outer slit 3a and the width L2 of the insulating film 2 between the outer slits 3a, it is preferable that L1 is about ⅗ to ½ of L2.

As shown in FIG. 3, a protruding part 2b in protrusion shape is formed on the inner periphery of the ring-shaped insulating film 2, so that the insulating film 2 is joined to the vibrating membrane 3 also at this protruding part 2b. However, a length of the protruding part 2b in the circumferential direction, that is, a width of the protruding part 2b is very small. Therefore, even if stress is applied to the substrate 1, a force transmitting the stress to the vibrating membrane 3 is very small. On the other hand, the width L1 of the ring-shaped insulating film 2 is formed to be as small as possible. Therefore, in such a case that the width of the insulating film 2 becomes L1 over the entire circumference, holding of the vibrating membrane 3 may not be sufficient. However, in the present embodiment, even in such a case, when the vibrating membrane 3 is joined to the protruding part 2b as well, holding of the vibrating membrane 3 is secured. In other words, this protruding part 2b contributes to holding of the vibrating membrane 3 while suppressing transmission of the stress of the substrate 1, which can make the width L1 of the portion of the ring-shaped insulating film 2 excluding the protruding part 2b as small as possible.

The vibrating membrane 3 is a movable electrode film formed by patterning a conductor film using a conductive polysilicon film or the like, for example, where aerial vibration by acoustic pressure is transmitted through the acoustic hole 5b formed on the fixed electrode 5a and the backplate 5 to the vibrating membrane 3 to vibrate the vibrating membrane 3, thereby generating a change in capacitance between the vibrating membrane 3 and the fixed electrode 5a, which is converted into an electric signal, and the electric signal is then transmitted to the outside from an extraction electrode (not shown). The example shown in FIG. 1 is characterized in that the vibrating membrane 3 is separated from the bottom portion of the spacer 4, and even if a portion of the conductor film is configured to exist under the spacer 4, a dividing groove may be formed to use an exposed portion at the central portion side from the dividing groove as the edge of the vibrating membrane 3. In other words, even if the conductor film divided by the dividing groove remains under the spacer 4, the conductor film remaining under the spacer 4 does not have any function, which is therefore not particularly required, and in this present specification, the term "vibrating membrane" essentially means a portion positioned at a position relative to the fixed electrode 5a, the edge of which refers to the edge 3d of the vibrating membrane 3.

Outer slits 3a and inner slits 3b are intermittently formed in the peripheral portion of the vibrating membrane 3 along the edge 3d thereof, respectively. The slit may be formed of one round or three or more rounds. Shapes and sizes of the slits 3a, 3b, and an interval between the intermittently formed slits 3a, 3b can be determined by considering various factors such as sensitivity of the MEMS element, stability of the vibrating membrane, strength of the vibrating membrane, sensitivity of the microphone, and distortion of the electrical signal. When the slits 3a, 3b are formed, even a slight acoustic pressure makes it easier to vibrate, thereby improving the sensitivity.

The slits 3a, 3b are formed to be positioned above the portion of the substrate 1 where no opening 1a is formed. When the slits 3a, 3b are formed at positions exposed to the opening 1a of the substrate 1, acoustic resistance is remarkably lowered, and sensitivity in a low frequency region is remarkably lowered in the MEMS element configured to have a small opening 1a. As shown in FIG. 1, when the slit 3a is formed to be positioned above the portion of the substrate 1 where no opening 1a is formed, a space between the vibrating membrane 3 and the substrate 1 can be utilized to increase the acoustic resistance. This space may be formed with the insulating film 2 being etched by permeating the etchant from the slits 3a, 3b when etching the sacrificial layer 41 (see FIG. 4H) in manufacturing the MEMS element. In FIG. 2, the slits 3a, 3b are provided with two rounds, but in the case of such a structure, it may be difficult for the etchant to permeate between the inner slits 3b, and etching residue may occur. In order to prevent such occurrence, an embodiment can be made in which an etching hole 3c is formed between the inner slits 3b as shown in FIG. 2.

That is, this is because that the inner slits 3b are also formed above the substrate 1, and therefore the etchant from the opening 1a of the substrate 1 does not permeate unless the insulating film 2 is removed, and the etchant from the inner slit 3b is also difficult to permeate between the inner slits 3b. A size of the etching hole 3c is determined so as not to leave any etching residue according to an interval between the inner slits 3b.

In addition, since the space between the vibrating membrane 3 and the substrate 1 which is formed by removing the insulating film 2 is very narrow, a phenomenon called sticking, in which the vibrating membrane 3 and the substrate 1 absorb each other during etching, may occur, and if such a phenomenon occurs, the MEMS element 100 may not operate. In order to prevent this sticking, the vibrating membrane 3 can be provided with bumps 3e. In consideration of misalignment, the bumps 3e may be provided not only outside the opening 1a but also inside the opening 1a. The bumps 3e do not need to have shapes provided with continuous ring-like convex parts, and may be provided with protrusions scattered on the circumference as shown in FIG. 3.

The spacer 4 is formed as a sacrificial layer by layering silicon oxide or the like and etching away the central portion after the backplate 5 is formed, and disposed between the backplate 5 and the substrate 1 to form a space between the fixed electrode 5a and the vibrating membrane 3 that serves as a movable electrode.

The fixed electrode 5a is formed by patterning a conductive film using a conductive polysilicon film, etc., and disposed at a position corresponding to the vibrating membrane 3 that serves as a movable electrode. An area of the fixed electrode 5a is optimized depending on how the vibrating membrane 3 vibrates.

The backplate 5 is formed by laminating a layered silicon nitride or a multilayer film of silicon nitride and silicon oxide on the fixed electrode 5a, and, together with the fixed electrode 5a, has a plurality of acoustic holes 5b in the central portion. The acoustic hole 5b is configured for transmitting sound pressure to the vibrating membrane 3 and formed at a position facing the vibrating membrane 3. The backplate 5 has etching holes 5c on the periphery of the plurality of acoustic holes 5b, and when the sacrificial layer 41 (see FIG. 4H) and the insulating film 2 are etched through these etching holes 5c, the exposed insulating film 2 at the edge 3d of the vibrating membrane 3 is also etched. In this case, the insulating film 2 is divided into an insulating film 2 under the vibrating membrane 3 and an insulating film at the bottom end of the spacer 4. Moreover, the insulating film 2 under the vibrating membrane 3 is etched near the edge 3d of the vibrating membrane 3 and the outer slit 3a. A degree and a balance of etching the insulating film 2 under the vibrating membrane 3 can be adjusted depending on positional relationships of the etching hole 5c with respect to the edge 3d of the vibrating membrane 3 and the outer slits 3a, a size of the etching hole 5c, and the like.

The etching hole 5c is formed to etch the sacrificial layer 41 and the insulating film 2 and has a different function from the acoustic hole 5b. Therefore, it is formed at a position closer to the edge of the substrate 1 further than the outer slit 3a and a position where the vibrating membrane 3 is joined to the substrate 1 through the insulating film 2, and does not contribute to vibration of the vibrating membrane 3. Rather, the forming position is determined so as to optimize the etching of the sacrificial layer 41 and the etching under the vibrating membrane 3. That is, by adjusting the distance between the outer slits 3a and the edge 3d of the vibrating membrane 3 and the etching hole 5c in this positional relationship, the insulating film 2 under the vibrating membrane 3 is configured to remain in a ring shape having a protruding part 2b at the inner peripheral end between the slits 3a by isotropically removing the insulating film on the edge 3d side of the vibrating membrane 3 and the inner peripheral side of the outer slits 3a from the slits 3a.

A shape of the acoustic hole 5b is not particularly limited and may be circular, rectangular, elliptical, or the like. A size of each acoustic hole 5b and an interval between the acoustic holes 5b are not particularly limited and are determined in consideration of sensitivity and noise characteristics. Moreover, as for arrangement of the plurality of acoustic holes 5b, circular acoustic holes 5b can be arranged so as to draw concentric circles from the central portion, for example, so as to face the circular vibrating membrane 3. At this time, the acoustic hole 5b may or may not be formed in the central portion.

The etching hole 5c has an important function in etching the insulating film 2 in the vicinity of the edge 3d of the vibrating membrane 3 as mentioned above, a shape of which is not particularly limited and may be circular, rectangular, elliptical, or the like. Specifically, similarly to the acoustic hole 5b, the etching hole 5c is formed in a circular shape, and the plurality of etching holes 5c are arranged at equal intervals so as to surround all of the plurality of acoustic holes 5b, around the peripheral portion of the plurality of formed acoustic holes 5b. At this time, the plurality of acoustic holes 5b are formed to have approximately the same size, but the etching holes 5c may be arranged at different sizes and intervals from the acoustic holes 5b.

A method of manufacturing the MEMS element of the present embodiment will be described below as one embodiment of the method of manufacturing the MEMS element of the present disclosure with reference to FIGS. 4A to 4H.

The method of manufacturing the MEMS element of the present embodiment, as FIGS. 4A to 4H show the manufacturing steps thereof, comprises the steps of: forming an insulating film 2 on a substrate 1 (see FIG. 4A); forming a conductive film 31 on the insulating film 2 (see FIG. 4C), patterning the peripheral edge thereof, as well as forming slits 3a, 3b (see FIG. 2) and, if necessary, etching holes 3c in the peripheral portion of the conductive film 31 (see FIG. 4D) to form a vibrating membrane 3; forming a sacrificial layer 41 on the vibrating membrane 3 (see FIG. 4E); forming a backplate film 51 including a fixed electrode 5a on the sacrificial layer 41 (see FIG. 4F); forming a backplate 5 comprising a plurality of acoustic holes 5b on the backplate film 51 and etching holes 5c around the periphery of the plurality of acoustic holes 5b (see FIG. 4G); forming an opening 1a in the substrate 1 at a position under the central portion of the vibrating membrane 3 (see FIG. 4H); and immersing the substrate 1 in an etchant, thereby leaving the peripheral portion of the sacrificial layer 41 as a spacer 4, as well as leaving only a part of the insulating film 2 between the outermost periphery of the outer slits 3a of the vibrating membrane 3 and the edge 3d of the vibrating membrane 3 and removing the remaining insulating film 2 under the vibrating membrane 3 (see FIG. 1). In addition, it is characterized in that the etching hole 5c is formed closer to the peripheral portion side of the backplate 5 than the outermost periphery of the outer slits 3a of the vibrating membrane 3 in planar view, and that the insulating film 2 remaining under the vibrating membrane 3 is made to remain to exist having a width that allows for influence of stress from the substrate 1 to be minimized and in a ring shape that holds the vibrating membrane 3, by adjusting at least one of a position of the etching hole 5c, a size of the etching hole 5c, an etching time, and a concentration of the etchant.

Figure 4A:
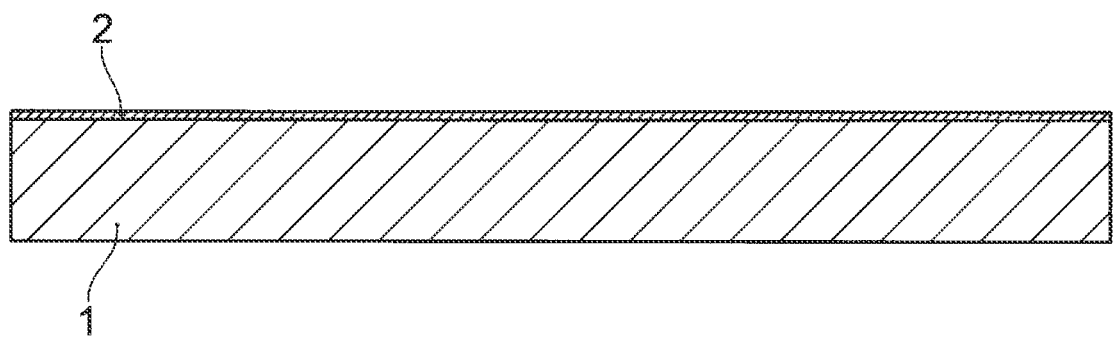
FIG. 4A is an explanatory view of manufacturing steps of the MEMS element of FIG. 1.
Figure 4B:
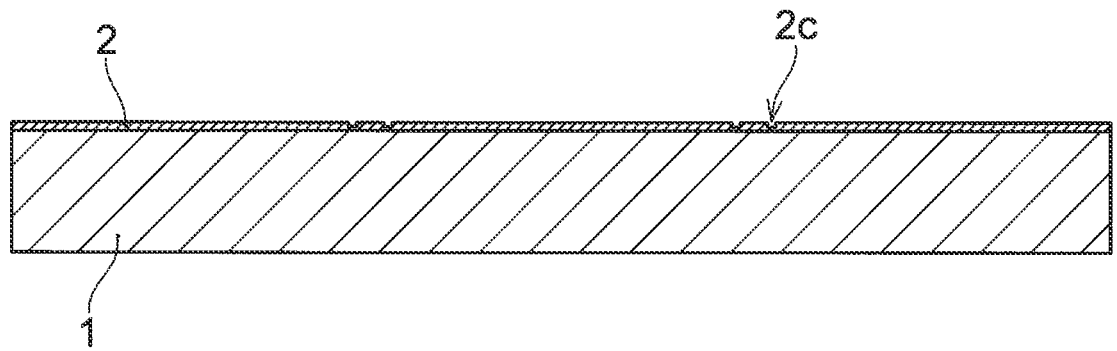
FIG. 4B is an explanatory view of manufacturing steps of the MEMS element of FIG. 1.

First, an insulating film 2 is formed on a substrate 1 (FIG. 4A). For example, an insulating film 2 made of silicon oxide is formed on the surface of the substrate 1. The insulating film 2 can be formed by a normal method in this technical field. For example, when the substrate 1 is a silicon substrate, the insulating film 2 may be formed by thermal oxidation or the like, or deposited by a CVD method. When the vibrating membrane 3 is provided with bumps 3e, recesses 2c for forming the bumps 3e are formed by etching the insulating film 2 at positions corresponding to positions where the bumps 3e are to be provided before laminating the vibrating membrane 3, or the like (FIG. 4B).

Figure 4C:
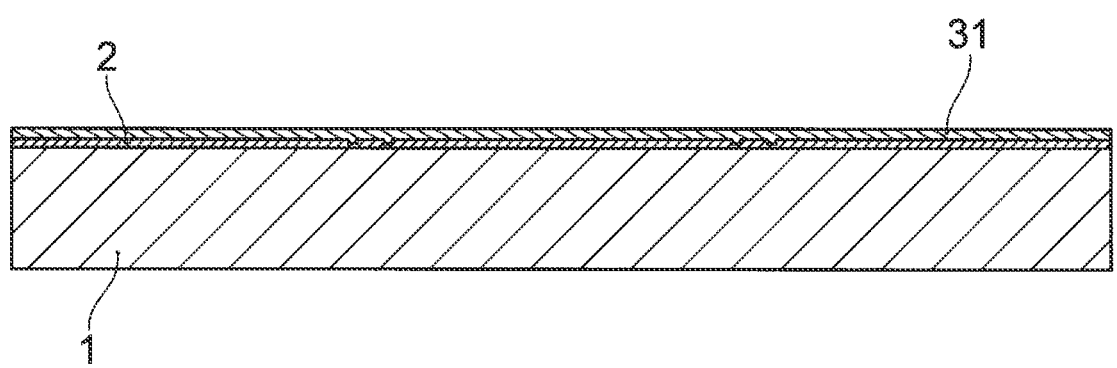
FIG. 4C is an explanatory view of manufacturing steps of the MEMS element of FIG. 1.
Figure 4D:
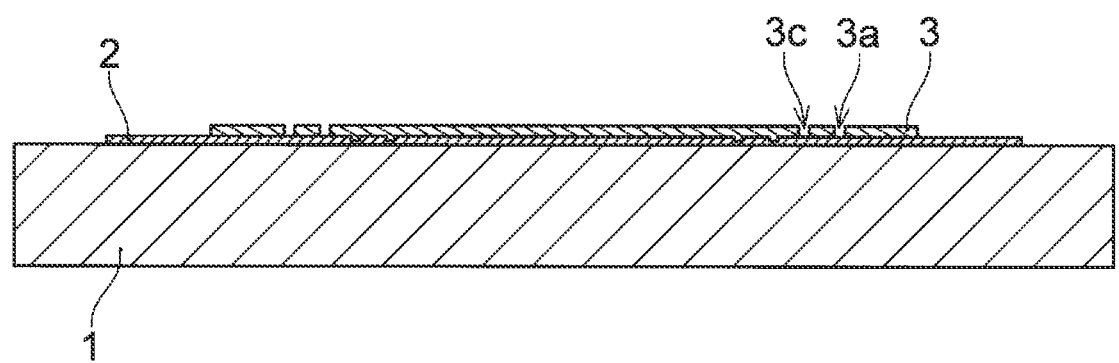
FIG. 4D is an explanatory view of manufacturing steps of the MEMS element of FIG. 1.

On this insulating film 2, a conductive polysilicon film having a thickness of about 0.2 to 1 μm is layered and formed as a conductor film 31 by, for example, the CVD method (FIG. 4C). In the conductive film 31, the peripheral portion, the outer slits 3a, the inner slits 3b (see FIG. 2), and, if necessary, the etching hole 3c are removed by patterning using a photolithographic method or the like to form a vibrating membrane 3 (see FIG. 4D). At this time, the conductor film 31 may be left in a part that will be under the spacer 4 without removing all in the peripheral portion, but it is disconnected from the vibrating membrane 3 with a dividing groove.

Next, a sacrificial layer 41 made of silicon oxide is layered and formed to have a thickness of, for example, about 3 μm (FIG. 4E), and a conductive polysilicon film is layered and formed on the sacrificial layer 41, according to a normal manufacturing process of the MEMS element 100. Next, patterning is performed by a normal photolithography method to form a fixed electrode 5a made of, for example, a polysilicon film, and a backplate film 51 made of silicon nitride is layered and formed (FIG. 4F).

Figure 4E:
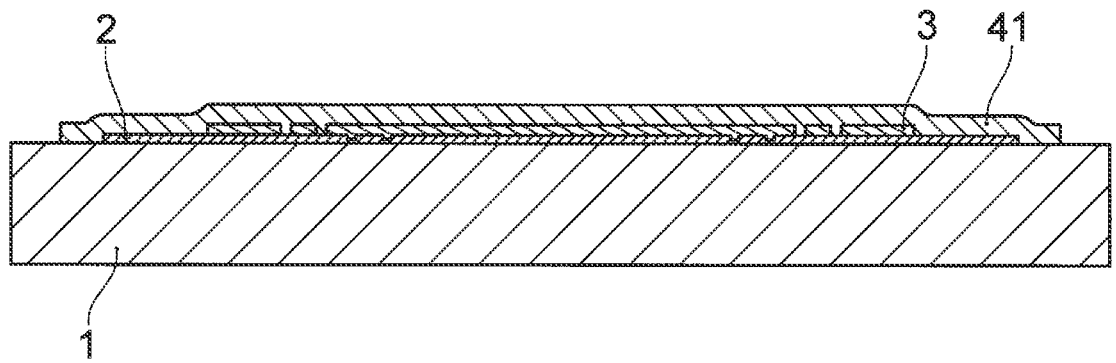
FIG. 4E is an explanatory view of manufacturing steps of the MEMS element of FIG. 1.
Figure 4F:
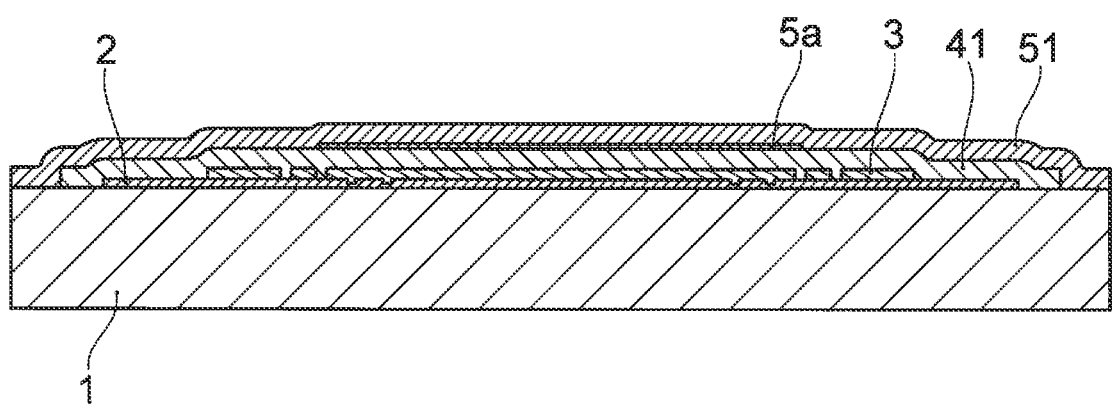
FIG. 4F is an explanatory view of manufacturing steps of the MEMS element of FIG. 1.
Figure 4G:
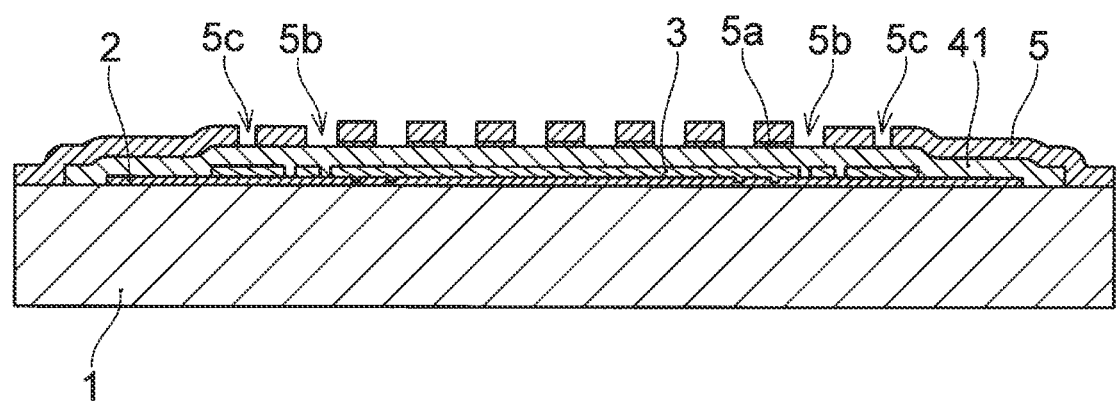
FIG. 4G is an explanatory view of manufacturing steps of the MEMS element of FIG. 1.

Then, in the backplate film 51 and the fixed electrode 5a, an acoustic hole 5b for transmitting sound pressure to the vibrating membrane 3 by a normal photolithographic method and an etching hole 5c for etching the sacrificial layer 41 and the insulating film 2 are formed, and the sacrificial layer 41 is partially exposed (FIG. 4G). At this time, the etching hole 5c is formed outside the acoustic hole 5b (in the edge side of the backplate film 51) and outside the fixed electrode 5a, as well as outside the outer slit 3a formed on the vibrating membrane 3 in planar view (the edge 3d side of the vibrating membrane 3), and at a position so as to overlap with the vibrating membrane 3 in planar view.

Figure 4H:
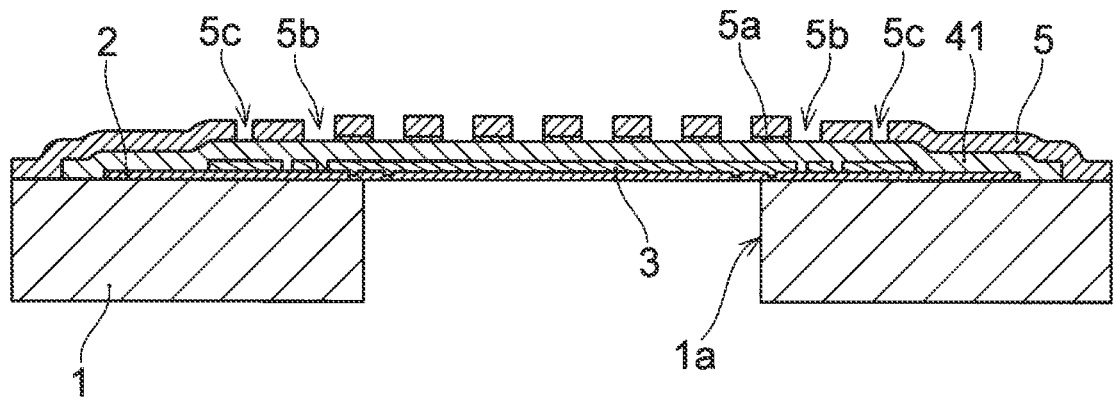
FIG. 4H is an explanatory view of manufacturing steps of the MEMS element of FIG. 1.

Then, the central portion of the substrate 1 is removed by etching from the back surface side, which is an opposite surface to a surface on which the insulating film 2 is formed, to expose the insulating film 2, thereby forming an opening 1a (FIG. 4H). The opening 1a is formed so that the bottom portions of the outer and inner slits 3a, 3b formed on the vibrating membrane 3 are not positioned within the opening 1a.

Finally, etching is initiated simultaneously from the acoustic hole 5b, the etching hole 5c, and the opening 1a to remove the sacrificial layer 41 and the insulating film 2, thereby forming a gap between the vibrating membrane 3 and the backplate 5. In addition, a portion of the insulating film 2 exposed to the opening 1a and portions connected to the slits 3a, 3b, and the edge 3d of the vibrating membrane 3 exposed by removing the sacrificial layer 41 are etched, including under the vibrating membrane 3, which results in the structure shown in FIG. 1.

That is, the insulating film 2 is etched not only at the portion exposed to the opening 1a, but also to the portions under the vibrating membrane 3 and connected to the opening 1a, the slits 3a, 3b, and the edge 3d. In other words, the insulating films 2 present on the lower surface of the vibrating membrane 3, all on the central side thereof from the outer slit 3a, are removed by etching with etchants from the opening 1a and the slits 3a, 3b, while on the edge 3d side from the outer slit 3a, only vicinities of the peripheral end of the outer slits 3a and the edge 3d of the vibrating membrane 3 are etched, between which the insulating film 2 remains as shown in FIG. 3.

As mentioned above, this remaining range of the insulating film 2 is very important from the viewpoints of suppression of transmission of the stress to the vibrating membrane 3 and a holding force for holding the vibrating membrane 3 with high reliability. However, it tends to fluctuate depending on production lots and the like. Accordingly, in the step of removing the insulating film 2, the removal is performed so that the insulating film 2 remaining under the vibrating membrane 3 has a width that is the minimum for holding the vibrating membrane 3 and that minimizes the influence of the stress from the substrate 1 by adjusting at least one of the position of the etching hole 5*c*, the size of the etching hole 5*c*, the etching time, and the concentration of the etchant, preferably performed so that etching of the edge 3*d* of the vibrating membrane 3 and etching of the vicinity of the outermost outer slit 3*a* have almost the same width.

Figure 5:
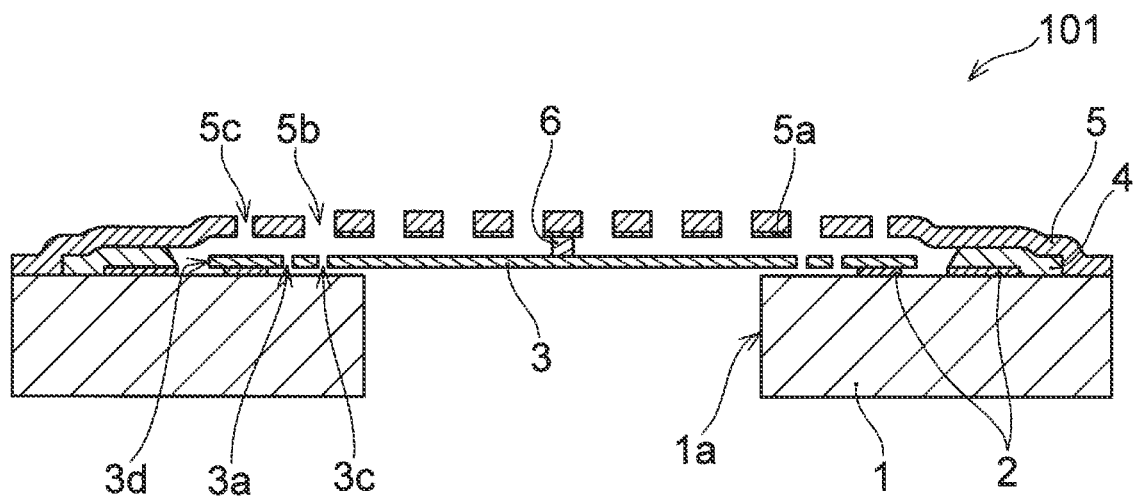
FIG. 5 is a cross-sectional schematic view of a MEMS element that is another embodiment of the present disclosure.

As another embodiment of the present disclosure the MEMS element 101 is shown in FIG. 5. This MEMS element 101 is provided with a pillar 6 that connects the vibrating membrane 3 and the backplate 5 at its central portion. Such pillar 6 is formed of an insulating material that remains unetched when the sacrificial layer 41 is etched, and fixes the central portion of the vibrating membrane 3 and the backplate 5, thereby improving a sound pressure level that makes sound and noise indistinguishable (Acoustic Overload Point (AOP)) and strength against an excessive pressure to obtain excellent acoustic signal and reliability resistance.

In order to form such a pillar 6, after forming the sacrificial layer 41 in FIG. 4E as mentioned above, a hole is made in the central portion of the sacrificial layer 41, into which silicon nitride or the like, which is the same material as the backplate 5, is embedded for the pillar 6, so that the pillar 6 can be formed by selective etching. Alternatively, it can also be formed by leaving a portion of the sacrificial layer 41 without opening the acoustic hole 5*b* in the central portion.

In FIG. 5, the etching holes 3*c* and bumps 3*e* are not shown for the vibrating membrane 3, which are not essential components, but are adopted in the present embodiment as necessary. Besides, in FIG. 5, the same parts as those in FIG. 1 are given the same reference numerals as those in FIG. 1, descriptions of which are omitted.

CONCLUSION (1) One embodiment of the MEMS element of the present disclosure comprises a substrate with an opening, a vibrating membrane formed on the substrate through an insulating film, wherein slits are intermittently formed in a peripheral portion of the vibrating membrane along an edge thereof, and a backplate that is fixedly formed on a spacer formed on a periphery portion of the substrate and has a plurality of acoustic holes in a central portion thereof, wherein the backplate has an etching hole at a position on an outer peripheral portion than the plurality of acoustic holes and closer to the edge than the outermost peripheral end of the slits of the vibrating membrane in planar view, wherein the slits are formed to be positioned above a portion of the substrate where the opening is not formed, wherein the edge of the vibrating membrane and the insulating film under the vibrating membrane are spaced apart from the bottom end of the spacer, and wherein a spacer side end of the insulating film under the vibrating membrane is positioned closer to the slits than the edge of the vibrating membrane and a slits side end of the insulating film under the vibrating membrane is positioned closer to the spacer than the slits.

According to the MEMS element of the present embodiment, stress of the vibrating membrane is not affected by other members, for example, the spacer and the backplate, and further, the influence of the insulating film positioned between the vibrating membrane and the substrate can also be suppressed, so that a MEMS element such as a stable microphone can be produced. In addition, since the vibrating membrane comprises a slit structure, a highly sensitive microphone can be produced, and optimization of the insulating film remaining under the vibrating membrane is easily achieved. Furthermore, by forming the slits in a place where the opening of the substrate is not formed, the acoustic resistance can be increased, and a microphone with flat frequency characteristics which can obtain desired frequency characteristics can be realized.

(2) Since the vibrating membrane is configured to have a pillar connecting the vibrating membrane and the backplate at its central portion, it improves in acoustic overload point (AOP) and can obtain an excellent acoustic signal.

(3) The insulating film remains in a ring shape by the insulating film being removed on the inner peripheral side of the slits, the width of the insulating film at the slit part in planar view is narrower than the width of the insulating film between the slits, and by configuring the insulating film to have unevenness at the inner peripheral end thereof, the area of the insulating film being the lower layer vibrating membrane is suppressed, so that the influence of the stress due to the insulating film can be further reduced.

(4) Since the vibrating membrane is configured to have bumps on the substrate-surface inside the slit, the possibility of occurrence of a phenomenon called sticking, in which the vibrating membrane and the substrate absorb each other during etching, can be eliminated.

(5) Since it is configured that the slits are provided with at least two rounds and an etching hole is formed between the slits on the inner round among the two rounds, etching residue can be prevented from occurring between the slits.

(6) One embodiment of the method of manufacturing the MEMS element of the present disclosure comprises the steps of: forming an insulating film on a substrate; forming a conductive film on the insulating film, patterning a peripheral edge thereof, as well as forming a slit in a peripheral portion of the conductive film to form a vibrating membrane; forming a sacrificial layer on the vibrating membrane; forming a backplate film including a fixed electrode on the sacrificial layer; forming a backplate which provided with a plurality of acoustic holes and an etching hole around the periphery of the plurality of acoustic holes in the backplate film; forming an opening in the substrate at a position below a central portion of the vibrating membrane; and removing the insulating film under the vibrating membrane so as to leave only a portion of the insulating film between the outmost periphery of the slit and an edge of the vibrating membrane, wherein substrate is immersed in an etchant, thereby a portion of the insulating film is removed from the outermost peripheral side of the slit of the vibrating membrane, while leaving a peripheral portion of the sacrificial layer as a spacer, characterized in that the etching hole is formed closer to the periphery portion side of the backplate than the outermost periphery of the slit of the vibrating membrane in planar view, and that the insulating film remaining under the vibrating membrane is made to remain in a ring shape that holds the vibrating membrane, by adjusting at least one of a position of the etching hole, a size of the etching hole, an etching time, and a concentration of the etchant.

According to the manufacturing method of the present embodiment, even if the manufacturing conditions change depending on a type of MEMS element and a manufacturing lot, an optimal amount of the insulating film can always be made to remain by adjusting any of the position or size of the etching hole and the etching condition, so that a MEMS element such as a uniform and highly sensitive MEMS microphone can be obtained.

(7) It is preferable that the etching of the insulating film is adjusted so that the insulating film remaining under the vibrating membrane has a protruding part in the shape of the central portion side of thereof.

REFERENCE SIGNS LIST 100, 101. MEMS element
1. Substrate
2. Insulating film
2a. Dividing groove
2c. Recess for forming bump
3. Vibrating membrane
3a. Outer slit
3b. Inner slit
3c. Etching hole
3d. Edge of vibrating membrane
3e. Bump
31. Conductive film
4. Spacer
41. Sacrificial layer
5. Backplate
5a. Fixed electrode
5b. Acoustic hole
5c. Etching hole
51. Backplate film
6. Pillar
200. MEMS element of related technology (microphone)
10. Substrate
20. Insulating film
30. Vibrating membrane
40. Spacer
50. Backplate

The invention claimed is:

1. A micro-electromechanical systems (MEMS) element, comprising:
a substrate with an opening;
a vibrating membrane formed on the substrate through an insulating film, wherein slits are intermittently formed in a peripheral portion of the vibrating membrane along an edge thereof; and
a backplate that is fixedly formed on a spacer formed on a peripheral portion of the substrate and has a plurality of acoustic holes in a central portion thereof,
wherein the backplate has an etching hole at a position on an outer peripheral portion than the plurality of acoustic holes and closer to an edge side than an outermost peripheral end of the slits of the vibrating membrane in planar view, wherein the slits of the vibrating membrane are formed to be positioned above a portion of the substrate where the opening is not formed, wherein the edge of the vibrating membrane and the insulating film under the vibrating membrane are spaced apart from a bottom end of the spacer, and wherein a spacer side end of the insulating film under the vibrating membrane is positioned closer to the slits than the edge of the vibrating membrane and, a slit side end of the insulating film under the vibrating membrane is positioned closer to the spacer than the slits of the vibrating membrane.

2. The MEMS element of claim 1, wherein said vibrating membrane has a pillar connecting the vibrating membrane and the backplate at its central portion.

3. The MEMS element of claim 2, wherein the insulating film remains in a ring shape by the insulating film being removed on the inner peripheral side of the slits of the vibrating membrane, wherein in planar view the insulating film includes a plurality of protrusion parts that protrude between the slits such that the width of the insulating film between the slits and the spacer side end of the insulating film is narrower than the width of the protrusion parts of insulating film between the slits, and the insulating film has unevenness at the inner peripheral end thereof.

4. The MEMS element of claim 3, wherein the vibrating membrane has bumps on the substrate-side surface inside the slits of the vibrating membrane.

5. The MEMS element of claim 4, wherein the slits of the vibrating membrane are provided with at least two rounds and an etching hole is formed between the slits of the vibrating membrane of an inner round among the two rounds.

6. The MEMS element of claim 3, wherein the slits of the vibrating membrane are provided with at least two rounds and an etching hole is formed between the slits of the vibrating membrane of an inner round among the two rounds.

7. The MEMS element of claim 2, wherein the vibrating membrane has bumps on the substrate-side surface inside the slits of the vibrating membrane.

8. The MEMS element of claim 7, wherein the slits of the vibrating membrane are provided with at least two rounds and an etching hole is formed between the slits of the vibrating membrane of an inner round among the two rounds.

9. The MEMS element of claim 2, wherein the slits of the vibrating membrane are provided with at least two rounds and an etching hole is formed between the slits of the vibrating membrane of an inner round among the two rounds.

10. The MEMS element of claim 1, wherein the insulating film remains in a ring shape by the insulating film being removed on an inner peripheral side of the slits of vibrating membrane, wherein in planar view the insulating film includes a plurality of protrusion parts that protrude between the slits such that a width of the insulating film between the slits and the spacer side end of the insulating film is narrower than the width of the protrusion parts of insulating film between the slits, and the insulating film has unevenness at an inner peripheral end thereof.

11. The MEMS element of claim 10, wherein the vibrating membrane has bumps on the substrate-side surface inside the slits of the vibrating membrane.

12. The MEMS element of claim 11, wherein the slits of the vibrating membrane are provided with at least two rounds and an etching hole is formed between the slits of the vibrating membrane of an inner round among the two rounds.

13. The MEMS element of claim 10, wherein the slits of the vibrating membrane are provided with at least two rounds and an etching hole is formed between the slits of the vibrating membrane of an inner round among the two rounds.

14. The MEMS element of claim 1, wherein the vibrating membrane has bumps on the substrate-side surface inside the slits of the vibrating membrane.

15. The MEMS element of claim 14, wherein the slits of the vibrating membrane are provided with at least two rounds and an etching hole is formed between the slits of the vibrating membrane of an inner round among the two rounds.

16. The MEMS element of claim 1, wherein the slits of the vibrating membrane are provided with at least two rounds and an etching hole is formed between the slits of the vibrating membrane of an inner round among the two rounds.

17. A method of manufacturing a MEMS element, the method comprising the steps of:
- forming an insulating film on a substrate;
- forming a conductive film on the insulating film, patterning a peripheral edge thereof, as well as forming a slit in a peripheral portion of the conductive film to form a vibrating membrane;
- forming a sacrificial layer on the vibrating membrane;
- forming a backplate film including a fixed electrode on the sacrificial layer;
- forming a backplate which provided with a plurality of acoustic holes and an etching hole around the periphery of the plurality of acoustic holes in the backplate film;
- forming an opening in the substrate at a position below a central portion of the vibrating membrane; and
- removing the insulating film under the vibrating membrane so as to leave only a portion of the insulating film between an outermost periphery of the slit and an edge of the vibrating membrane, wherein the substrate is immersed in an etchant, thereby a portion of the insulating film is removed from the outermost peripheral side of the slit of the vibrating membrane and from the edge side of the vibrating membrane, while leaving a peripheral portion of the sacrificial layer as a spacer, and,
- characterized in that the etching hole is formed closer to the peripheral portion side of the backplate than the outermost periphery of the slit of the vibrating membrane in planar view, and that the insulating film remaining under the vibrating membrane is made to remain in a ring shape that holds the vibrating membrane, by adjusting at least one of a position of the etching hole, a size of the etching hole, an etching time, and a concentration of the etchant.

18. The method of claim 17, wherein the etching of the insulating film is adjusted so that the insulating film remaining under the vibrating membrane has a protruding part in the shape of the central portion side thereof.

* * * * *